(12) United States Patent
Chambeyron et al.

(10) Patent No.: US 11,169,990 B2
(45) Date of Patent: Nov. 9, 2021

(54) RE-COMPUTING PRE-COMPUTED SEARCH RESULTS

(71) Applicant: Amadeus S.A.S., Biot (FR)

(72) Inventors: Cyril Antoine Chambeyron, Antibes (FR); Nadege Ricolfi, Antibes (FR); Johann Marchi, Nice (FR); Eric Jean Joseph Martin, Villeneuve Loubet (FR); Abdelhakim Cherif, Brno-Starý Lískovec (CZ)

(73) Assignee: AMADEUS S.A.S., Biot (FR)

(*) Notice: Subject to any disclaimer, the term of this patent is extended or adjusted under 35 U.S.C. 154(b) by 92 days.

(21) Appl. No.: 16/570,423

(22) Filed: Sep. 13, 2019

(65) Prior Publication Data
US 2020/0097470 A1    Mar. 26, 2020

(30) Foreign Application Priority Data
Sep. 20, 2018 (FR) ...................................... 1858505

(51) Int. Cl.
*G06F 16/00* (2019.01)
*G06F 16/242* (2019.01)
(Continued)

(52) U.S. Cl.
CPC ........ *G06F 16/2425* (2019.01); *G06F 16/248* (2019.01); *G06F 16/24561* (2019.01); *G06F 16/24578* (2019.01)

(58) Field of Classification Search
CPC ........... G06F 16/2425; G06F 16/24561; G06F 16/24578; G06F 16/248; G06F 16/24552
(Continued)

(56) References Cited

U.S. PATENT DOCUMENTS

| 10,395,294 B2* | 8/2019 | Legrand ............. G06Q 30/0631 |
| 2005/0055426 A1 | 3/2005 | Smith et al. |

(Continued)

FOREIGN PATENT DOCUMENTS

| EP | 2991070 A1 | 3/2016 |
| WO | WO2013160721 A1 | 10/2013 |
| WO | 2014026753 A1 | 2/2014 |

OTHER PUBLICATIONS

European Patent Office, European Search Report issued in Application No. 19198340.2 dated Oct. 7, 2019.
(Continued)

*Primary Examiner* — Thanh-Ha Dang
(74) *Attorney, Agent, or Firm* — Thompson Hine LLP

(57) ABSTRACT

Pre-computed search results are re-computed by a computation platform based on available computing resources. A search platform maintains at least a first and a second group of pre-computed search results and provides the first group of pre-computed search results at a first provision time and the second group of pre-computed search results at a second provision time to requesting clients. A re-computation controller schedules the re-computation of the pre-computed search results on the basis of validity probabilities being associated with the pre-computed search results and the respective provision times. Re-computation of the first group and the second group is scheduled such that the validity of the search results of the first group given by the validity probabilities is maximized at the first provision time and the validity of the pre-computed search results of the second group given by the validity probabilities is maximized at the second provision time.

20 Claims, 8 Drawing Sheets

(51) Int. Cl.
*G06F 16/2455* (2019.01)
*G06F 16/2457* (2019.01)
*G06F 16/248* (2019.01)

(58) Field of Classification Search
USPC .......................................................... 707/720
See application file for complete search history.

(56) References Cited

U.S. PATENT DOCUMENTS

| | | | | |
|---|---|---|---|---|
| 2006/0085394 | A1* | 4/2006 | Barsness | G06F 16/24557 |
| 2009/0177667 | A1 | 7/2009 | Ramos et al. | |
| 2013/0073586 | A1* | 3/2013 | Aubry | G06F 16/2455 |
| | | | | 707/769 |
| 2014/0052750 | A1* | 2/2014 | Ciabrini | G06F 16/24552 |
| | | | | 707/769 |
| 2015/0161211 | A1* | 6/2015 | Patel | G06F 16/24539 |
| | | | | 707/721 |
| 2015/0234890 | A1* | 8/2015 | Legrand | H04L 67/10 |
| | | | | 707/769 |
| 2016/0125497 | A1* | 5/2016 | Legrand | G06Q 30/0625 |
| | | | | 705/26.62 |
| 2016/0171008 | A1* | 6/2016 | Ciabrini | G06F 16/24552 |
| | | | | 707/609 |
| 2020/0097483 | A1* | 3/2020 | Shi | G06F 16/254 |

OTHER PUBLICATIONS

National Institute of Industrial Property, Preliminary Search Report issued in French Patent Application No. 1858505 dated Jul. 18, 2019.

Ilarri et al., "Using cooperative mobile agents to monitor distributed and dynamic environments" Information Sciences vol. 178, Issue 9, May 1, 2008, pp. 2105-2127.

Sankaranarayanan et al., "SMILE: A Data Sharing Platform for Mobile Apps in the Cloud", Proc. of 17th International Conference on EDBT, (c) 2014.

* cited by examiner

RE-COMPUTING PRE-COMPUTED SEARCH RESULTS

The present subject-matter generally relates to information technology. More specifically, it is directed to database technology and mechanisms for re-computing pre-computed search results.

BACKGROUND

It is known to pre-compute search results and return pre-computed search results in response to search queries instead of only computing the search results at query time. In this way, response times can be shortened. Pre-computed search results have to be kept up-to-date in order to ensure that valid responses are returned. If the underlying data (being the basis for the pre-computation of the search results) changes, the pre-computed search results may get outdated and incorrect results would be returned. Thus, update strategies are employed to keep the pre-computed search results up-to-date.

One general approach to keep the pre-computed search results up-to date is to re-compute the pre-compute search results in a periodic manner. To this end, the correctness and validity of the returned pre-computed search results are kept on a certain level.

Various further computation strategies are known in the prior art like for example, re-computing the pre-computed search results re-computing the pre-computed search results driven by some quality threshold criteria.

US 2005/0055426 concerns a system that pre-caches information from internet sites that the system expects the user to request. The system schedules the pre-caching to occur at the most appropriate time of a day in order to increase the likelihood that the most recent information is provided to the user.

US 2009/0177667 uses techniques for populating a data cache on a server. Data requests received by the server are collected in a repository. US 2009/0177667 teaches to include results into a cache based on a predictive model ("data mining model") predicting which results will be accessed by clients during the next day or days of the next week. Further, US 2009/0177667 teaches that the data cache is filled based on the granularity of days and for a given week.

Finally, WO 2014/026753 describes a data cache platform which maintains pre-computed database query results computed by a computation platform. The data cache platform determines probabilities of the pre-computed database query results being outdated to automatically issue re-computation orders to the computation platform for updating pre-computed database query results on the basis of the determined probabilities. The data cache platform further utilizes a "UserAccuracy" which is based on the average access frequency to update the pre-computed database query results.

SUMMARY

According to a first aspect, a method of re-computing pre-computed search results is provided. The method is performed in a database environment. The database environment includes at least one search platform, a re-computation controller and a computation platform. The search platform maintains pre-computed search results. The pre-computed search results are subdivided into at least a first group of pre-computed search results and a second group of pre-computed search results. The search platform provides the first group of pre-computed search results at a first provision time and the second group of pre-computed search results at a second provision time to requesting clients. The re-computation controller controls re-computation of the pre-computed search results on the basis of validity probabilities being associated with the pre-computed search results. The computation platform re-computes the pre-computed search results. The re-computation controller schedules the re-computation of the first group and the second group of the pre-computed search results by the computation platform. The re-computation is based on available computing resources of the computation platform. The validity probabilities are further associated with the pre-computed search results of the first group and second group and the respective provision times. The computation platform might have insufficient computing resources to re-compute all pre-computed search results of the first and the second group of pre-computed search results until the respective provision times. The scheduling comprises scheduling the re-computation of the first group and the second group of the pre-computed search results such that the validity of the search results of the first group given by the validity probabilities is maximized at the first provision time and the validity of the pre-computed search results of the second group given by the validity probabilities is maximized at the second provision time. Finally, the search platform provides the first group of pre-computed search results at the first provision time and the second group of pre-computed search result at the second provision time to the respective requesting clients.

According to a second aspect, a corresponding re-computation controller arranged to execute the method is provided.

According to a third aspect, a computer program stored on a storage medium is provided which, when executed by a computation machine, equips the computation machine with the corresponding functionality.

Further optional aspects are set forth as well.

BRIEF DESCRIPTION OF THE FIGURES

The present mechanisms will be described with reference to accompanying figures. Similar reference numbers generally indicate identical functionally similar elements.

DETAILED DESCRIPTION

As already outlined at the outset, the methodologies described herein relate to database environments which offer search results to clients. In order to be able to handle search queries which require computations on the basis of large volumes of expected data, search results are generally pre-computed and stored as database records in a database. Hereinafter, the terms "pre-computation" and "pre-computed" cover any sort of pre-computation and pre-collection such as Internet crawlers collecting or copying the content of Internet web servers, but also more complex and time-intensive computations of search results on the basis of underlying data. The technical aim of pre-computation is generally to decrease response times for responding to search queries compared to a computation only at search query time.

The term "database" is meant to encompass any types of structured information storage system such as standard stand-alone databases like SQL Server® or Oracle® databases as well as complex, distributed and/or proprietary storage systems, relational databases including database management systems or object-oriented database systems and the like. The database is queried by requesting entities (such as clients, applications, browsers installed on user terminals etc.) in the course of a search and pre-computed search results fulfilling search criteria indicated by the search queries are returned to the client in response to the query.

The term "search queries" is meant to encompass any type and content of a request provided by a client to the database. Such content relates to the data requested as pre-computed search results from the database. For example, the content of the search query is directed to request the state i.e. the explicit content of time-varying information just at a pre-determined point of time. To this end, the requesting search query contains at least an indication to the requested type of information and the concrete time it is expected by the requesting client to provide the requested information by the database.

Figure 1:
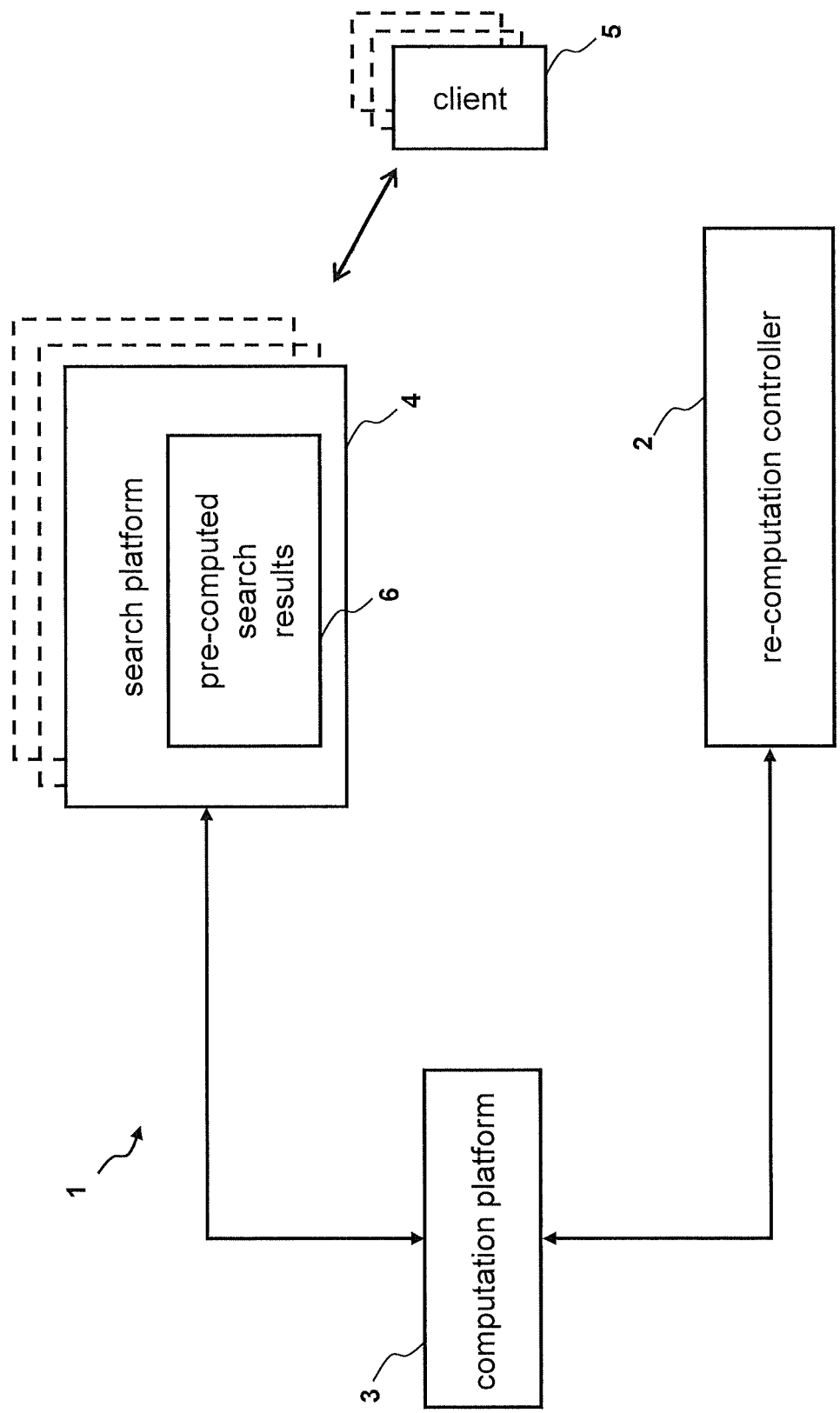
FIG. 1 schematically shows a distributed database environment.

FIG. 1 illustrates a database environment 1 at a schematic level. The search platform 4 maintains pre-computed search results 6. The re-computation controller 2 is connected to the computation platform 3 and issues re-computation orders to the computation platform 3 to re-compute pre-computed search results 6. The computation platform 3, in turn, transmits the corresponding re-computed search results 6 to the search platform 4 and, in addition, to the re-computation controller 2 which also maintains the pre-computed search results 6 for reasons of re-computation control. Clients 5 such as applications and/or stationary or mobile user terminals access the pre-computed search results 6 from the search platform 4. As shown by FIG. 1, one or several search platforms 4 may be present in environment 1. If a plurality of search platforms 4 is present, the pre-computed search results 6 may be maintained in a distributed manner over the several search platforms 4 and re-computation controller 2 may control the re-computation of all pre-computed search results 6 distributed over search platforms 4. The search platform 4 may also offer a heterogeneous set of pre-computed search requests, e.g. some search platforms 4 maintain pre-computed search requests relating to air travel, other search platforms 4 stored pre-computed search request related to insurances and other search platforms 4 keep pre-computed (or pre-crawled) search requests related to Internet websites. Such a heterogeneous environment may be controlled by one single re-computation controller 2 or by a plurality of re-computation controllers 2. A plurality of search platforms 4 may also be present for reasons of redundancy, to increase failure safety and/or performance.

Pre-computing search results 6 and storing them in the search platform 4 accessible to querying clients 5 leads to the general situation that the calculation data may change over time and, thus, the pre-computed search results 6 get outdated or invalid (both terms are used synonymously herein). Pre-computed search results 6 which are still up-to-date, i.e. which match the corresponding real-time computation equivalents (results which would be actually computed on demand without having pre-computed search results 6 available), are called "valid" or "accurate" pre-computed search results 6 hereinafter. Thus, when the pre-computed search results 6 in the search platform 4 correctly represent the current state of the data domain underlying the pre-computed search results 6, i.e. the calculation data, the pre-computed search results 6 stored in the search platform 4 are—in general—accurate.

Generally, to enable the search platform 4 to return correct results, one wants to maintain a high degree of correlation between pre-computed search results 6 which are provided to the querying entity 5 in response to database queries and their real-time computation equivalents. At the same time, however, it is desirable to minimize computation resource consumption caused by re-computations because the available computing resources of the computation platform 3 are limited and, generally, there are not enough computing resources to re-compute all pre-computed search results 6 at all times. Thus, a trade-off between re-computation of the pre-computed search results 6 and utilization of the available computing resources is sought.

According to the re-computation strategy of the pre-computed search results 6 presented herein, the re-computation of pre-computed search results 6 is scheduled depending on access or delivery times of the pre-computed search results 6, hereinafter referred to as provision times. Re-computation scheduling is implemented by the re-computation controller 2 of a database environment 1, as illustrated in FIG. 1. The re-computation scheduling of the pre-computed search results 6 yields a point of time to start with a re-computation of a pre-computed search result 6 in order to provide the pre-computed search result 6 to the requesting one or more clients 5 just in time after concluding the re-computation of the pre-computed search result 6. These points to start re-computation are referred to as re-computation start times hereinafter. The effect of this is that a pre-computed search result 6 which has been re-computed shortly before its provision of a content-requesting client 5 is likely to be accurate.

Figure 2:
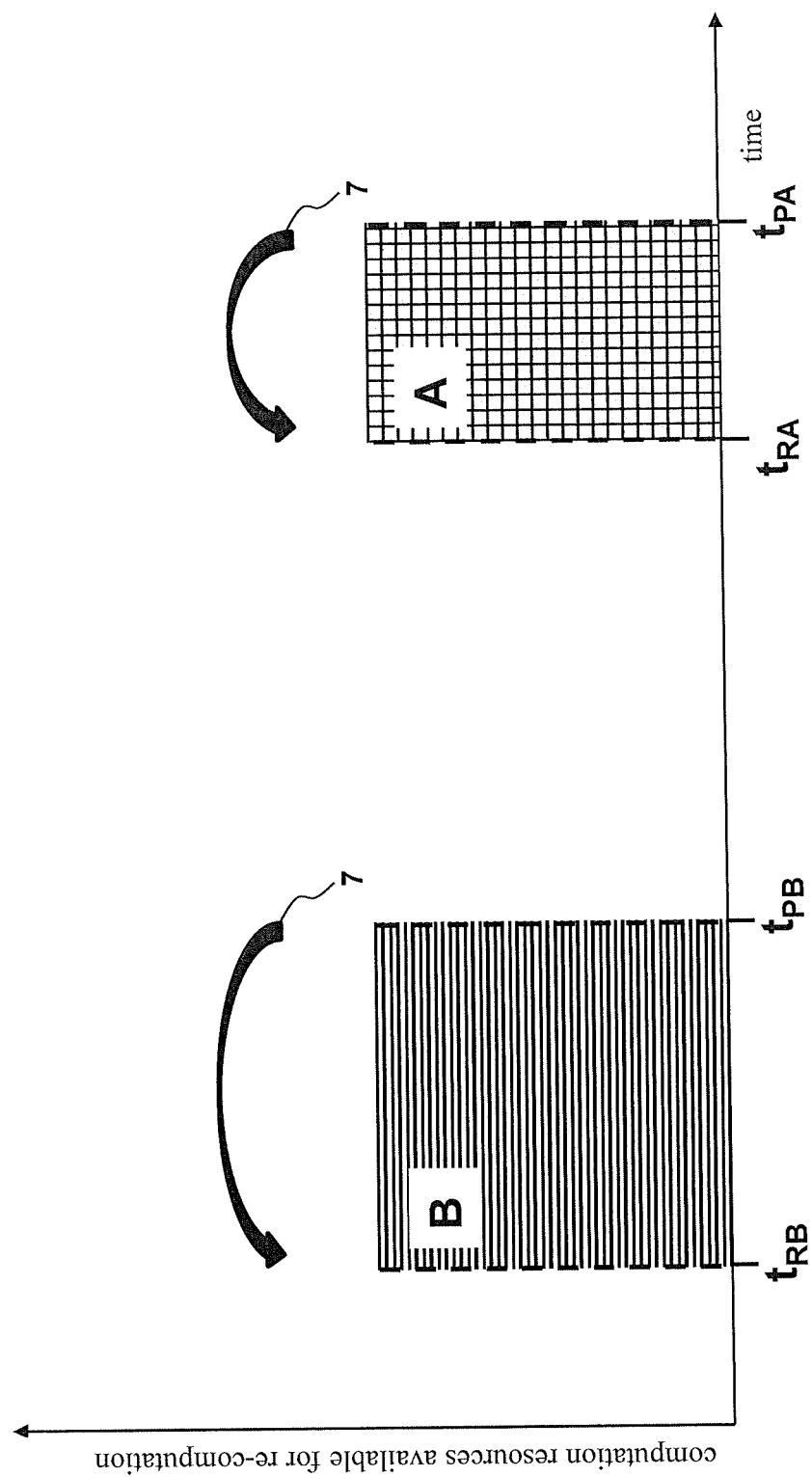
FIG. 2 visualizes scheduling a re-computation of pre-computation results in order to provide updated pre-computed search results at a given time to the requesting clients.

An example is given by FIG. 2. Here, two exemplary pre-computed search results A and B are maintained by the search platform 4 of the database environment 1. Both pre-computed search results A and B are known or expected to be provided at a respective given time, namely pre-computed search result A at provision time $t_{PA}$ and pre-computed search result B at time $t_{PB}$.

Note that these provision times may be of various granularity, such as points in time given at a level of seconds (e.g. 11:15:30 a.m.), minutes (e.g. 11:30 a.m.) or hours (11 a.m.). Hence, at a lower granularity, the provision times in fact constitute time periods in which the exact point of time of provision is not determined (for example, a provision time of 11 a.m. means that the pre-computed search result in question will be delivered or retrieved at some point of time between 11 a.m. and 11:59 a.m.).

Further, in some examples, the provision times indicating the time of retrieval or delivery of the groups of pre-computed search results are pre-set in the database environment 1. For example, a content requesting client 5 may indicate to the search platform 4 when the client 5 will retrieve which groups of pre-computed search results 6 and this information is stored at a given storage location (e.g. in the re-computation controller 2). Provision times may also be transmitted by any other way and/or entity to the database environment 1, e.g. by email, irrespective of which particular client 5 will later retrieve the groups of pre-computed search results. In other examples, the re-computation controller 2 estimates provision times by collecting and evaluating empirical values of the former provision times of the pre-computed search results 6 in the past. In these examples, the provision times are modelled based on the expectation of a repetitive request behaviour of requesting clients 5, similar to EP 2 991 070 B1.

Based on these respective provision times, re-computation of the pre-computed search results A and B is scheduled 7 by deriving respective re-computation start times, namely re-computation start time $t_{RB}$ for pre-computed search result B and re-computation start time $t_{RA}$ for pre-computed search result A. In general, the re-computation starts time are determined based on the computation resources required to re-compute the respective pre-computed search result as well as the computation resources of the computation platform 3 which are available during the time period before the respective provision times. Starting the re-computation of the both pre-computed search results A and B at these two times $t_{RA}$ and $t_{RB}$ has therefore the effect that their re-computation is concluded just in time at their respective provision times $t_{PA}$ and $t_{PB}$.

Note that the simplified example of FIG. 2 assume that a certain amount of computation resources is always available and the provision times are separated over time so that no scheduling conflict occurs. However, this assumption is generally not feasible in practice as computation resources of the computation platform 3 will generally be limited and vary over time, and it may occur that the provision times of e.g. two pre-computed search results A and B are close together (or even identical) and it is therefore not possible to conclude the re-computation of A and B at their respective provision times. Thus, the re-computation strategy as described herein generally distributes the available limited computation resources of the computation platform 3 to re-compute pre-computed search results 6 in a manner that the accuracy of the pre-computed search results 6 at their provision times for delivery to the requesting clients 5 is optimized in situations of insufficient computation resources and/or conflicting provision times.

These situations of insufficient computation resources and/or conflicting provision times can have the effect that either not all pre-computed search results to be provided to a client 5 at a given provision time can be re-computed prior to the provision time, i.e. a part of the pre-computed search results to be provided at the provision time is not re-computed in relation to the provision time. In this regard, re-computation scheduling as described herein includes determining and selecting which of the pre-computed search results to be provided at the provision time are to be re-computed prior to the provision time $t_P$ and which are not. This is referred to as selection scheduling hereinafter.

Furthermore, even if generally sufficient computation resources are available prior to the provision times to re-compute all pre-computed search results to be provided at the provision time, it may not be possible to re-compute all pre-computed search results to be provided at the provision time en bloc, due to conflicting provision times which are close together (or even identical). In this regard, re-computation scheduling as described herein includes determining which pre-computed search results of two or more conflicting groups are to be re-computed at which re-computation time $t_R$. This is referred to as time scheduling hereinafter.

This is generally different from other computation strategies known in the art, such as the cache update computation strategies according to U.S. Pat. No. 8,356,026 B2 and US 2009/0177667 A1 which do not take into account possibly limited computation resources or conflicting provision times. The computation strategy described herein increases the accuracy of pre-computed search results 6 returned to clients 5 particularly in these situations of insufficient computation resources to re-compute all pre-computed search results to be delivered to the clients 5. Likewise, the proposed computation strategy decreases the computation resources required for re-computation of the pre-computed search results 6 compared with these prior art references.

The re-computation strategy presented herein may employ the following parameters for a pre-computed search result i:

The age $t_i$ of the pre-computed search result i: the time since the last computation of this pre-computed search result 6 by the computation platform 3.

The invalidity rate $\lambda_i$ of the pre-collected search result i is a measure of how long the pre-collected search result i remains valid or how fast the pre-collected search result i becomes invalid due to changes of the underlying original data. This invalidity rate of a given pre-computed search result i is, for example, statistically derived from the occurrence and the outcomes of past (re-) computations or (re-) collections and comparisons of the re-collected search result with its previous state or values. For example, it has been determined that a particular pre-collected search result i has an invalidity rate $\lambda_i$ of 10% per hour meaning that the probability of i being valid decreases by 10% every hour. At the time of its (re-) collection or (re-)computation, i is generally 100% valid. After one hour, i is valid with a probability of 90%. After two hours the validity of i is 81% (=90% decreased by another 10%). After three hours, the probable validity of i is at 72.9%, and so on.

Figure 3:
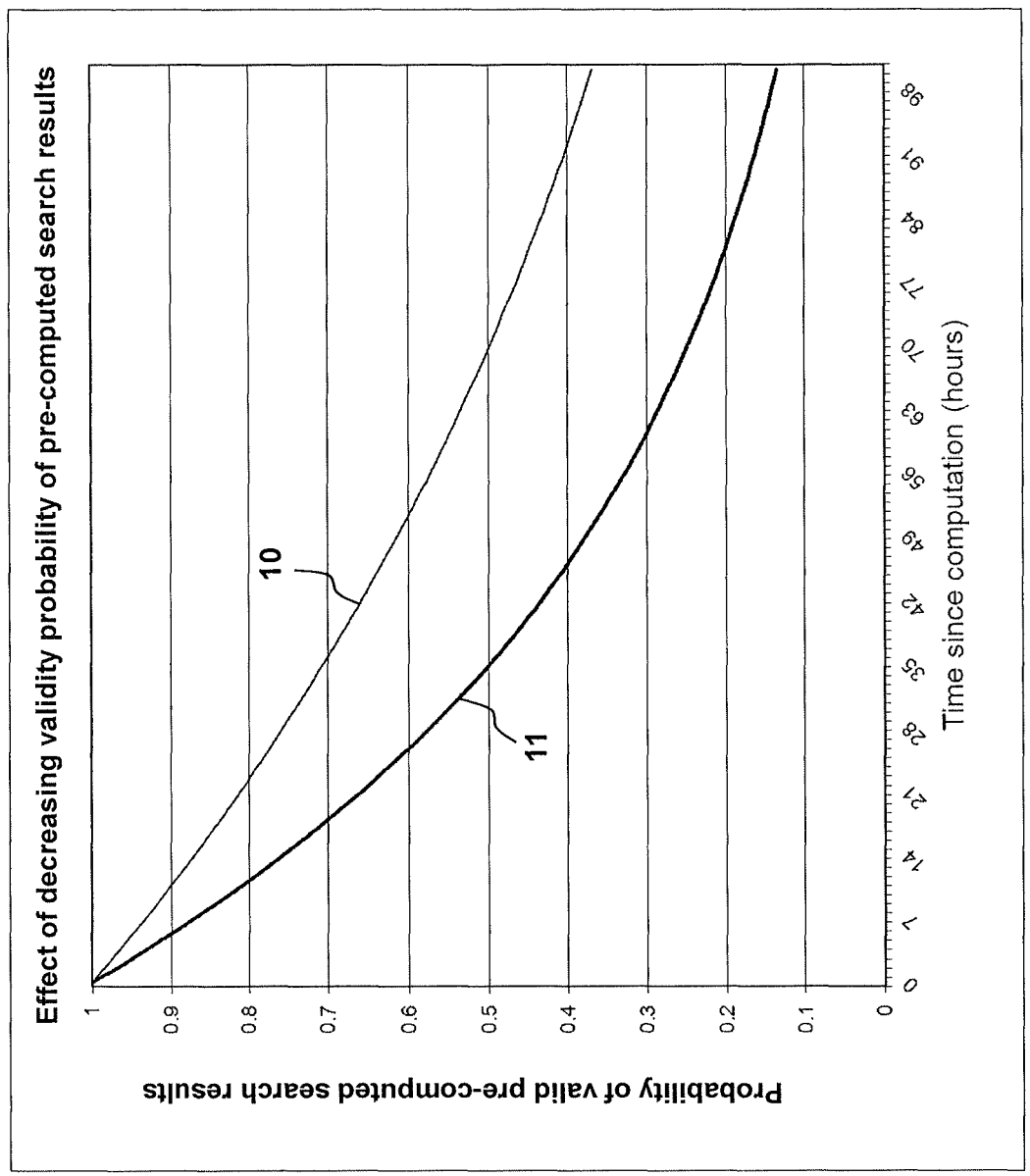
FIG. 3 illustrates a decrease of a validity probability of two pre-computed search results or groups of pre-computed search results over time.

The invalidity rate $\lambda_i$ may be employed to provide an estimate of the probability for a pre-computed search result to stay valid after a provision time: P(unchanged after t)=$e^{-\lambda_i \cdot t}$. This is also referred to as the expected accuracy $acc_i=e^{-\lambda_i t_i}$ or, more general, as the probability of a pre-computed search result being valid or, in other words, not being outdated. Two exemplary functions of this probable accuracy decreasing over time 8 are depicted by FIG. 3. Function 10 represents a pre-computed search result which potentially remains more accurate (or, more correctly, stays at a higher probability of being valid over time) than another pre-computed search result associated with function 11. For example, the pre-computed search result represented by function 10 has 70% probability of being still valid at 35 hours after its last re-computation, while the other pre-computed search result characterized by function 11 is only valid up to about 50% at hours after its latest re-computation. Functions 10 and 11 may also represent whole sets or groups of pre-computed search results and then indicate proportions of the sets/groups of pre-computed search results likely being valid at a time passed since the last re-computation of the set.

The "popularity" $p_i$ of the pre-computed search result i: this is the average access frequency to this pre-computed search result by the end users. As already briefly indicated above, it may be desirable to achieve a better accuracy for these pre-computed search result that are more often requested by the users than other pre-computed search results 6. Thus, the accuracy of the whole sum of pre-computed search results 6 in the search platform 4 as seen by the clients 5 may also be defined in that each accuracy value is weighted by the popularity of the respective pre-computed search result. Thus, the proportion of accurate accesses to the pre-computed search results 6 as opposed to the expected proportion of accurate pre-computed search results 6 is included.

Scheduling the re-computation of pre-computed search results 6 maintained by the search platform 4 is generally described at the level of groups of pre-computed search results 6. A group of pre-computed search results 6 includes one or more pre-computed search results 6. For example, a group of pre-computed search results 6 contains multiple related pre-computed search results 6, e.g. results which are prescribed by a search query of a requesting client 5. For example, such search query relates to multiple search results that are specified by the same search parameters. Generally, a group of pre-computed search results refers herein to a number of pre-computed search results which are requested by or delivered to at least one client 5 at a given provision time $t_P$. Although the mechanisms presented herein are exemplarily described by using a limited number of groups of pre-computed search results (such as two or three groups), the mechanisms generally apply to any number of groups of pre-computed search results.

For example, the pre-computed search results 6 may be results of computer-based electronic circuit simulations (such as circuit simulations subject of decision T 1227/05 by the EPO Boards of Appeal) and contain information on input values for the computer-based simulations, parameters of a model used by the computer-based simulations, intermediate and/or final simulation results, and the like. Pre-computation here is executing simulation run with particular input parameters and re-computing a pre-computed search result means repeating a simulation run. This computer-based simulation related data is kept in the search platform 4 and may be queried by a client 5 in order to retrieve simulation results. A search query may e.g. specify a certain simulation run and, hence, all pre-computed search results relating to this specified simulation run form a group of pre-computed search results.

In some examples, the decrease of the validity probability of pre-computed search results 6 which are grouped in a group of pre-computed search results 6 follow an equal or at least similar validity rate $\lambda_i$. Thus, as already shown in FIG. 3, the illustrated functions 10 and 11 of the validity probability decreasing over time relates to two different groups A and B of pre-computed search results 6 with equal or at least similar validity rates $\lambda_i$. Re-computing a pre-computed search result or a group of pre-computes search results 6 resets the validity probability functions 10 and 11. Hence, a pre-computed search result or group of re-computed search results is generally valid directly after its re-computation and its validity probability again decreases over time according the functions 10 and 11.

Figure 4:
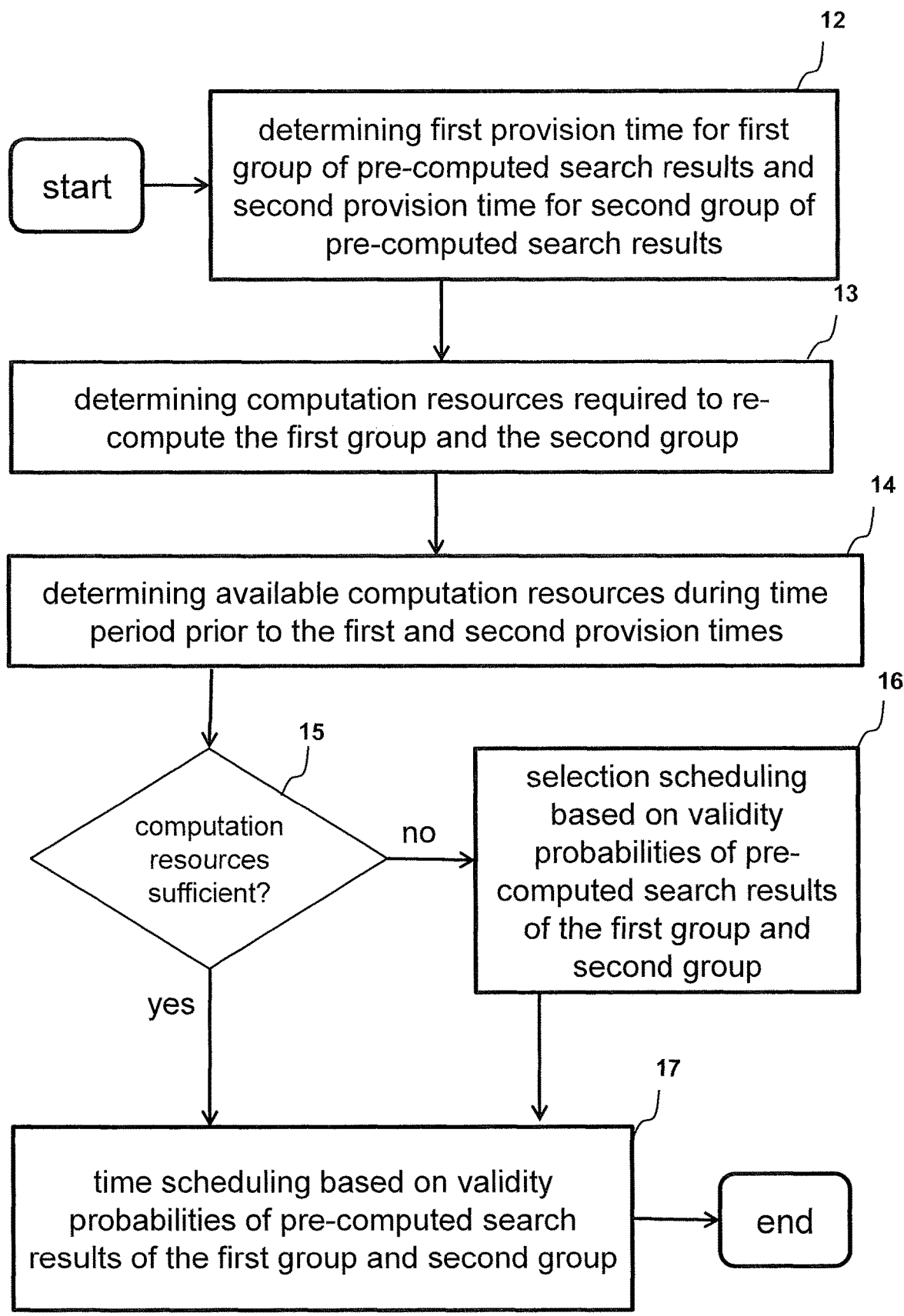
FIG. 4 is a re-computation scheduling flowchart.

Re-computation scheduling mechanisms are now explained with reference to the flowchart of FIG. 4. The activities of FIG. 4 are executed by the re-computation controller 2. In general, the re-computation controller schedules the re-computation of a first group of pre-computed search results (such as group A in FIG. 2) and a second group of pre-computed search results (such as group B in FIG. 2) by the computation platform 3 such that the validity of the search results of the first group providing by the validity probabilities is maximized at the first provision time and the validity of the pre-computed search results of the second group providing by the validity probabilities is maximized at the second provision time. Re-computation scheduling is based on
- available computing resources of the computation platform 3,
- validity probabilities associated with the pre-computed search results of the first group of pre-computed search results and the second group of pre-computed search results and
- the respective provision times of the at least two groups of pre-computed search results.

More specifically, the re-computation controller 2 first determines 12 a first provision time for the first group of pre-computed search results (e.g. $t_{PA}$ of FIG. 2) and a second provision time for the second group of pre-computed search results (e.g. $t_{PB}$ of FIG. 2). If the provision times are known, e.g. as the requesting client 5 has previously announced when which group will be retrieved by the client 5 and was stored by the environment 1, determining 12 may include retrieving the provision times from the storage location of the environment 1. If the provision times are approximately modeled by a probabilistic model, determining 12 may include retrieving the provision times from the probabilistic model.

Next, the re-computation controller 2 determines 13 the computation resources which are required to re-compute all pre-computed search results of the first and second group. Determination 13 may e.g. include estimating the computation resources by multiplying the number of pre-computed search results in the first and second group with an average or default computation resource to re-compute a single pre-computed search result. In some embodiments, determination 13 may be more exact, such as calculating the sum of individual computation resources for each of the pre-computed search results in a group or taking into account potential computation synergy effects which decreases the computation resources per per-computed search results with an increasing number of pre-computed search results in a group, similar as described by EP 2913764 A1.

Next, the re-computation controller 2 determines 14 available computation resources of the computation platform 3 during a time period prior to the first and second provision times (e.g. during a time with available computation resources prior to $t_{PA}$ in FIG. 2). Determination 14 may include determining the cumulative overall amount of computation resources available prior to the first provision time and the second provision time, whichever is later.

Next, the re-computation platform 2 determines 15 whether or not the available computation resources are sufficient to re-compute the first group and the second group completely, i.e. whether the available computation resources of the computation platform as determined by determination 14 are equal to or greater than the computation resources required to re-compute the first group and the second group are determined by determination 13.

Determining 15 may yield that computation platform 3 has insufficient computing resources to re-compute all pre-computed search results of the first and the second group of pre-computed search results until the respective provision times. In response to determining that the computation resources of the computation platform 3 are insufficient to re-compute the first group and the second group completely, the re-computation controller 2 then performs selection scheduling 16 by determining subportions of the first group and second group to be re-computed with the available computation resources. To this end, the re-computation controller 2 determines the validity probabilities of the pre-computed search results of the first group and of the second group. The re-computation controller 2 then selects which pre-computed search results of the first group and of the second group are to be re-computed prior to the first and second provision times, respectively, based on the determined validity probabilities.

In some embodiments, the re-computation controller 2 incrementally selects pre-computed search results of the two groups with increasing validity probability until the computation resources prior to the provision times are exhausted. In other words, the re-computation controller 2 selects pre-computed search results having a lower validity probability at the provision time of their respective group and discards pre-computed search results having a higher validity probability at the provision time of their respective group than the selected pre-computed search results. In this way, the validity of the pre-computed search results is optimized at their respective provision times despite the insufficient computation resources.

In response to determining 15 that the computation resources of the computation platform 3 are sufficient to re-compute the first group and the second group completely prior to the respective provision time, or after concluding selection scheduling 16, the re-computation controller 2 performs time scheduling 17 in order to determine which (of the selected) pre-computed search results of the two groups are re-computed at which times prior to the respective provision time.

In some embodiments, time scheduling 17 includes determining the re-computation starting times $t_R$ as outlined already above with reference to FIG. 2. To this end, the re-computation controller 2 determines whether or not the (selected) pre-computed search results of a group can be re-computed en bloc prior to the provision time $t_P$ of the group by repeating the activities 13, 14 and 15 at the level of each individual group concerned. Thus, the re-computation controller 2 determines the available computation resources prior to the latest provision time (e.g. $t_{PA}$ in FIG. 2) and after the earlier provision time (e.g. $t_{PB}$ in FIG. 2) and the available computation resources prior to the earlier provision time (e.g. $t_{PB}$ in FIG. 2). The re-computation controller 2, for each of the two groups, further determines the computation resources required to re-compute all (selected) pre-computed search results of the respective group. The re-computation controller 2 then determines whether the computation resources required to re-compute a group are available prior to the provision time of the group.

If affirmative, it is possible to re-compute all (selected) pre-computed search results of a group en bloc prior to the provision time of the group which might be beneficial due to potential computation synergies as mentioned above. In this case, the re-computation controller 2 determines the re-computation start time $t_R$ and instructs the computation platform 3 to re-compute all or all selected pre-computed search results of the group starting at the re-computation start time and to forward the re-computed search results to the search platform 4 until the provision time $t_P$. An example of an en bloc re-computation of two groups will be described below with reference to FIG. 5.

Otherwise, it is not possible to re-compute all or all selected pre-computed search results of a group en bloc, but rather in an interleaved manner. In this case, time scheduling 17 determines which parts of which groups are to be re-computed at which times. In some embodiments, this is done by a reverse planning per group. The reverse planning starts with the group having the latest provision time (e.g. group A with provision $t_{PA}$ in FIG. 2). The re-computation controller 2 determines the percentage of the (selected) pre-computed search results of this group can be re-computed in the time slot prior to the provision time of the group and after the previous provision time (e.g. $t_{PB}$ of group B in FIG. 2) and e.g. schedules a corresponding portion of the group for re-computation in this time slot. In order to maximize the validity of the group at the provision time, the portion includes these pre-computed search results of the group with the lowest validity probabilities (at provision time). Likewise, the same is repeated for the group of pre-computed search results with the earlier provision time (e.g. group B with provision $t_{PB}$ in FIG. 2), and so on. A particular implementation example of a scheduling algorithm will be given further below. If the computation resources between two provision times are not exhausted, another portion of a group with a later provision time (which was already scheduled due to the reverse time scheduling) is scheduled for re-computation. An example of this will be described further below with reference to FIG. 6.

After concluding the time scheduling 17, the re-computation controller 2 generates re-computation orders and sends the re-computation orders to the computation platform 3 in order to make the computation platform 3 to re-compute the pre-computed search results of the first group and of the second group in accordance with the outcome of the re-computation scheduling. The computation platform 3 then re-computes the pre-computed search results as instructed and sends the re-computed search results to the search platform 4. At the respective provision times, the search platform 4 provides the first group of pre-computed search results at the first provision time and the second group of pre-computed search result at the second provision time to the respective requesting clients.

Figure 5:
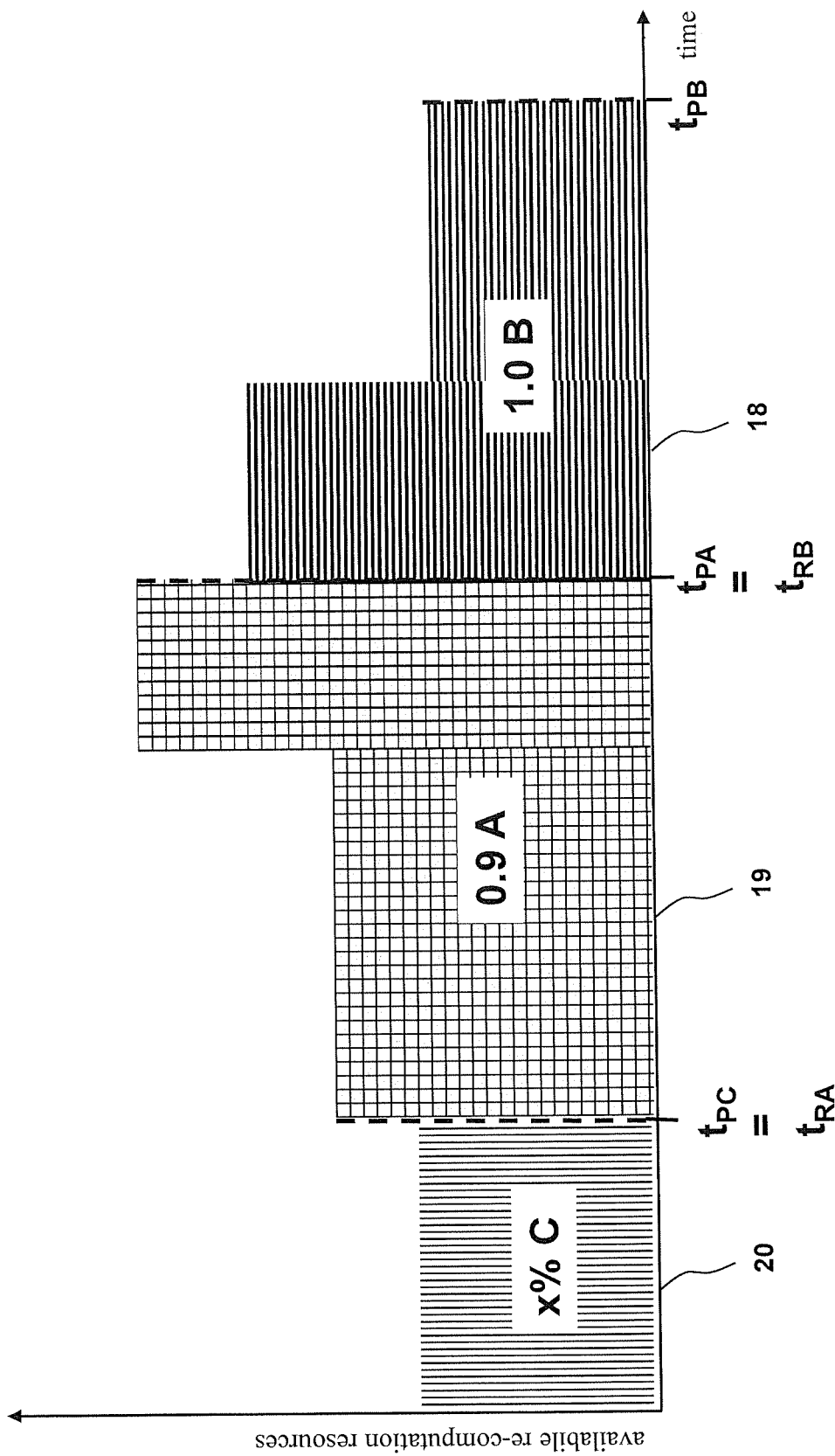
FIG. 5 depicts re-computation en bloc scheduling of two groups of pre-computed search results under insufficient computation resources.

FIG. 5 shows an exemplary scheduling situation in accordance with some embodiments. According to this example, three groups of pre-computed search results are to be re-computed, namely group C to be provided to at least one client 5 at provision time $t_{PC}$, group A to be provided at provision time $t_{PA}$ and group B to be provided at provision time $t_{PB}$. Re-computation of group C is not to be considered in detail, but only visualizes that the computation resources of the computation platform 3 are also utilized before re-computation of group A commences after provision time $t_{PC}$, i.e. at $t_{RA}$. Thus, FIG. 5 indicates that some portion of group C (x %) is to be re-computed prior to $t_{PC}$.

With respect to scheduling re-computation of the pre-computed search results of group A and group B, the scheduling algorithm may first treat group B as $t_{PB}$ is later than $t_{PA}$. The re-computation controller 2 determines that the computation platform 3 has sufficient capacity in the time interval between $t_{RB}$ (which coincides with $t_{PA}$) and $t_{PB}$ to re-compute the pre-computed search results of group B entirely (1.0 B, i.e. 100% of group B). Within group B, time scheduling determines which pre-computed search result of group B is to be re-computed at which point of time within the time interval $t_{PA}$ to $t_{PB}$, taking into account the validity probabilities of the pre-computed search results of group B, and also taking into account potential variation of the available computation resources of the computation platform 3 during this time interval (visualized in the examples of FIG. 5 in that more computation resources are available during a first part of the time interval $t_{PA}$ to $t_{PB}$ and less computation resources are available during a second part of the time interval $t_{PA}$ to $t_{PB}$). For example, in order to maximize the validity probabilities of the pre-computed search results of group B at $t_{PB}$, time scheduling considers the validity rate $\lambda_i$ of the pre-computed search results of group B, e.g. such that pre-computed search results having a higher invalidity rate $\lambda_i$ are re-computed later the time interval between $t_{PA}$ and $t_{PB}$ (as they are likely outdated again earlier) than pre-computed search results having a lower invalidity rate $\lambda_i$ (as they are likely outdated later).

With continuing reference to FIG. 5, scheduling then turns to the re-computation of the pre-computed search results of group A which is to be conducted by using the computation resources of the computation platform 3 which are available in the time interval between $t_{PC}$ and $t_{PA}$. The re-computation controller 2 determines that the available computation resources of the computation platform 3 are insufficient to re-compute all pre-computed search results of group A, but are only sufficient to re-compute 90% of the pre-computed search results of group B (0.9 A). Hence, 10% of the pre-computed search results of group A are not re-computed prior to $t_{PA}$. In this case, as explained above with reference to FIG. 4, selection scheduling first determines which pre-computed search results of group A are to be re-computed in the time interval between $t_{PC}$ and $t_{PA}$. As also explained above, this is based on the validity probabilities of the pre-computed search results of group A. For example, the 10% of the pre-computed search results of group A with the highest validity probabilities are not re-computed while the remaining 90% of the pre-computed search results of group A having lower validity probabilities are scheduled to be re-computed in the time interval between $t_{PC}$ and $t_{PA}$. Next, time scheduling determines which pre-computed search results out of the selected 90% of the pre-computed search results of group A are to be re-computed at which point of time within the time interval between $t_{PC}$ and $t_{PA}$. Again, this takes into account the validity probabilities of the pre-computed search results of group A, and also potential variations of the available computation resources of the computation platform 3 during this time interval (visualized in the examples of FIG. 5 in that less computation resources are available during a first part of the time interval $t_{PC}$ to $t_{PA}$ and more computation resources are available during a second part of the time interval $t_{PC}$ to $t_{PA}$). For example, in order to maximize the validity probabilities of the pre-computed search results of group A at $t_{PA}$, time scheduling considers the validity rate $\lambda_i$ of the pre-computed search results of group A, e.g. again such that more volatile pre-computed search results having a higher invalidity rate $\lambda_i$ are re-computed later the time interval between $t_{PC}$ and $t_{PA}$ than more stable pre-computed search results having a lower invalidity rate $\lambda_i$.

Figure 6:
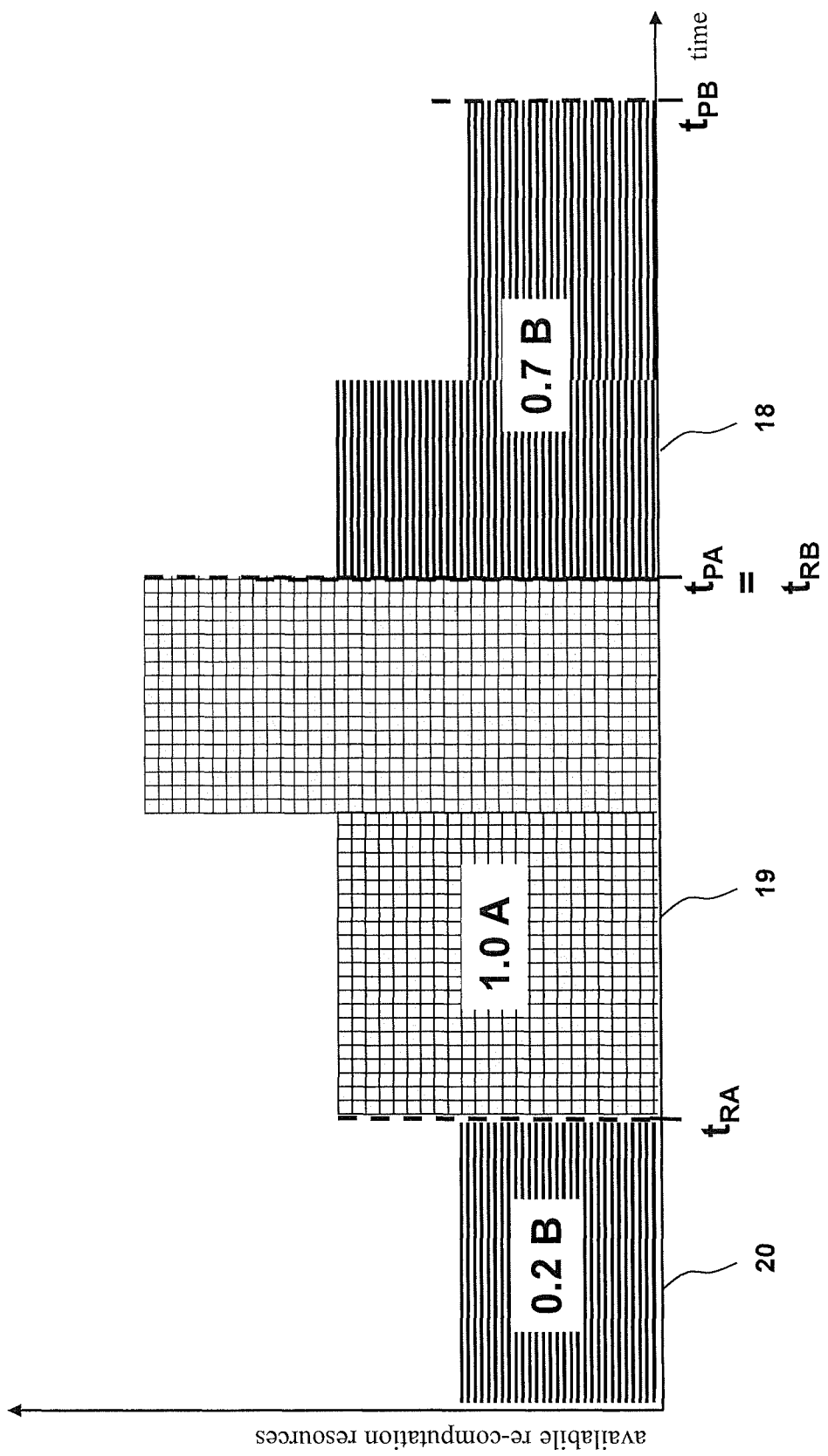
FIG. 6 depicts re-computation interleaved scheduling of two groups of pre-computed search results under insufficient computation resources.

A further scheduling example is given by FIG. 6. Similar to FIG. 5, two groups of pre-computed search results are scheduled for re-computation prior to their respective provision times, namely group A and B. With respect to group B, the scheduling functionality of the re-computation controller 2 determines that the time and available computation resources in the time interval between $t_{PA}=t_{RB}$ of FIG. 6 are too short to re-compute all pre-computed search results of group B, so that only 70% of the pre-computed search results of group B can be re-computed during this time interval (0.7 B). The selection scheduling of the re-computation scheduler 2 determines which of the pre-computed search results constitute these 70% based on the validity probabilities of the pre-computed search results of group B, preferring pre-computed search results of group B having a lower validity probability than pre-computed search results having a higher validity probability.

On the other hand, similar to group B in the example of FIG. 5, group A of the example of FIG. 6 can be re-computed entirely (1.0 A) during the time interval between $t_{RA}$ and $t_{PA}$. Time scheduling for group A is performed in a similar manner as described above with reference to FIG. 5. Further, time scheduling of the re-computation controller 2 is performed for group A in a similar manner as already described above.

Beyond the example of FIG. 5, the re-computation controller 2 further determines that computation resources of the computation platform 3 are still available at an earlier phase, namely before $t_{PA}$. The selection scheduling part of the scheduling functionality of the re-computation controller 2 determines that a portion of the remaining 30% of group B which was not selected for re-computation in the time interval $t_{RB}$ to $t_{PB}$ can be re-computed using these available computation resources prior to $t_{RA}$, namely further 20% of the pre-computed search results of group B (0.2 B). This further increases the validity of the pre-computed search results of group B to be provided to a client 5 at the provision time of group B $t_{PB}$. Again, the selection and time scheduling of these exemplary 20% occur in the same manner as already described in detail above.

Figure 7:
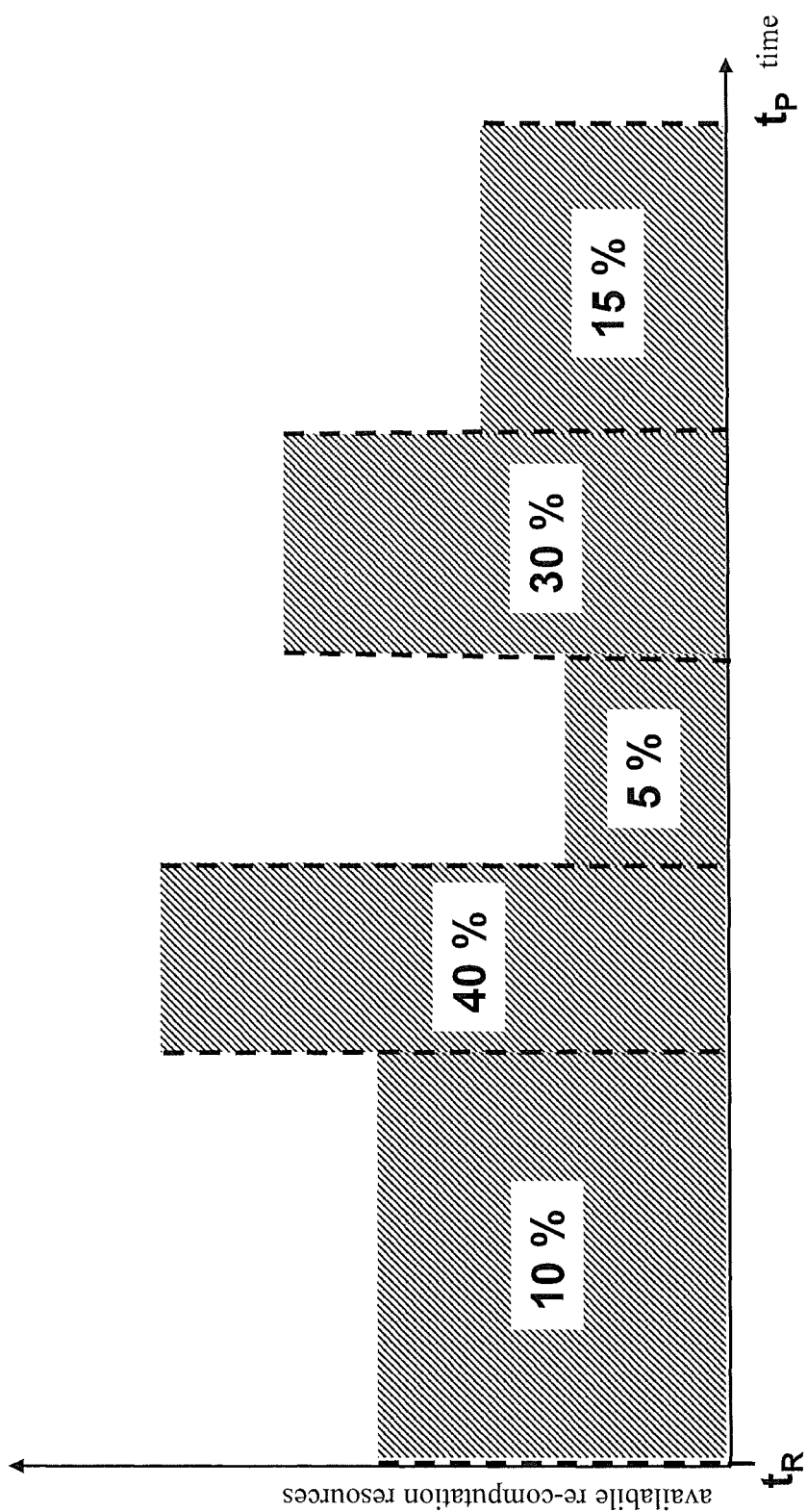
FIG. 7 illustrates time scheduling at the level of an individual group of pre-computed search results.

FIG. 7 depicts a non-limiting example of time scheduling within one group of pre-computed search results within a time interval $t_R$ to $t_P$ (provision time). As explained above, the validity rate $\lambda_i$ of a pre-computed search result indicates how soon the pre-computed search result becomes outdated due to a change of the underlying original data. In some embodiments, it may therefore be beneficial to time-schedule the re-computation of pre-computed search results within a group such that more volatile pre-computed search having a higher validity rate $\lambda_i$ are re-computed later within the time interval concerned and more stable pre-computed search having a lower invalidity rate $\lambda_i$ are re-computed later within the time interval concerned. In other words, in these embodiments, the pre-computed search results with the highest invalidity rates $\lambda_i$ (the 15% in FIG. 7) are scheduled to be re-computed last (in order to maximize the probability that they are valid at the provision time), while the pre-computed search results with the highest invalidity rates $\lambda_i$ (the 10% in FIG. 7) are scheduled to be re-computed first, while further subportions of pre-computed search results of the group with lower, medium and higher invalidity rates $\lambda_i$ (the 40%, 5% and 30% in FIG. 7) are scheduled to be re-computed in between. Note that the subportions of pre-computed search results of the group shown in FIG. 7 are at an exemplary granularity only. Time scheduling may be located at any granularity down to individual pre-computed search results.

In some embodiments, re-computation scheduling additionally takes into account access frequencies of pre-computed search results 6 of arbitrary client accesses beyond any provision times. In these embodiments, the search platform 4 is not only arranged to provide the clients 5 with groups of pre-computed search results at the provision times $t_P$, but also arranged to receive requests for pre-computed search results 6 (including pre-computed search results of of group A and/or group B) at an arbitrary point of time.

In general, in these embodiments, re-computation scheduling additionally prefers re-computing pre-computed search results having a higher access frequency than re-computing pre-computed search results with a lower access frequency if the computation resources are insufficient to re-compute all pre-computed search results of a given group prior to the provision time of the group. This yields additional validity of those pre-computed search results which are requested more often than other pre-computed search results and, thus, generally increases the validity of all pre-computed search results from the perspective of the clients 5.

A specific implementation example using a more formal notation is given next. To this end, available re-computation time is divided the time in time slots $S_j$ ($\{S_1 \ldots S_j \ldots S_T\}$) of equal duration. For example, the duration of each time slot $S_j$ is the shortest time to compute one search result (i.e., the slot duration can be seen as the unit of time). Furthermore, $D_i$ ($\{D_1 \ldots D_i \ldots D_T\}$) is defined as the data (smallest unit of pre-computed search results, group of pre-computed search results) that is to be re-computed in a given time slot.

For the purpose of the implementation example, it is assumed that each unit of data $D_i$ requires the same amount of time to be computed, i.e. the same computation resources are to be employed on the computation platform for every $D_i$. Based on the schedules, i.e. the provision times e.g. across the day which are e.g. provided by the clients, and based on the validity rates $\lambda_i$, associated to the pre-computed search results to be provided to the clients, and based other optional metrics to be taken into account, a weight $W_{i,j}$ is calculated which specifies an individual gain provided by a re-computation of the data $D_i$ at the time slot $S_j$, with respect to the future provision time $t_P$. More specifically, given a next provision time $t_P$ for which group of pre-computed search results is to be re-computed, the weight can be defined as $W_{i,j} = p_i * e^{-\lambda_i(t_P-j)} * K$, where $p_i$ is the optional factor of the access frequency, $\lambda_i$ is the validity rate of the data $D_i$ as explained above, $t_P$ is the provision time as explained above, j denotes the time slot considered and K is an additional optional weighting factor which allows a further differentiation between pre-computed search results (e.g. to compensate a potential difference of CPU costs between re-computations of two pre-computed search results $D_1$ and $D_2$, as the above assumption of uniform computation resources needed to re-compute any $D_i$ might not be correct in practice).

As the computation resources of the computation platform 3 are limited, only one data $D_i$ can be computed at each slot $S_j$, as mentioned above. A scalar referred to as $X_{i,j}$ is equal to 0 if $D_i$ is re-computed at slot $S_j$, and 1 otherwise. The constraint is that the sum($X_{i,j}$) over all $D_i$ is equal to 1.

Using the notations above, the criteria $$\max\left(\sum_{D_i \, data} \sum_{S_j \, slots} X_{i,j} * W_{i,j}\right)$$

with the following constraints, as already set forth above, $$\sum_{S_j} X_{i,j} = 1 \text{ (one computation per time slot)}$$

$X_{i,j} \in \{0, 1\}$ (indicator of position of data $i$ in time slot $j$)

determines the maximum of the sum of the weights $W_{i,j}$, over all time slots $S_j$ and all pre-computed search results $D_i$ considered. This provides a measure to schedule the pre-computed search results over time to maximize the validity probability of the pre-computed search results to be provided to the clients at the respective provision times. As mentioned above, it is possibly that i>j which means that there are not enough computation resources to compute all pre-computed search results to be provided at their provision times.

Known linear programming toolkits (such as the GNU Linear Programming Kit, GLPK) provide implementation options to find a suitable set of the scalars $X_{i,j}$ to solve the criteria above under the given constraints. This exemplary implementation algorithm is used iteratively to populate the N respective time slots between two provision times within a particular greater timeframe such as a day.

Thus, generally, re-computations of pre-computed search results are reversely planned over a certain timeframe (e.g. daily) in order to optimize the re-computations of pre-computed search results to be provided to clients at given provision times. This is realized by applying the exemplary implementation algorithm described above for each of the time slots between two provision times (with respect to FIGS. 5 and 6, e.g. between $t_{PB}$ and $t_{PA}$, then $t_{PC}$ and $t_{PA}$, and so on). Hence, scheduling the re-computation of the first group and the second group of the pre-computed search results comprises determining a weight $W_{ij}$ for each pre-computed search result $D_i$ of the first and second group, wherein the weight $W_{ij}$ specifies a gain provided by a re-computation of the respective pre-computed search result $D_i$ at a time slot $S_j$ prior to the respective provision time of the first and second group. If not all the computation capacity of the time slots between two provision times has been exhausted to re-compute the pre-computed search results due at the later provision time of the two provision times, i.e. in the case of a temporary over-capacity, the remaining available time slots can be used to re-compute pre-computed search results which are due at later provision times, as this increases the global accuracy of the pre-computed search results.

Figure 8:
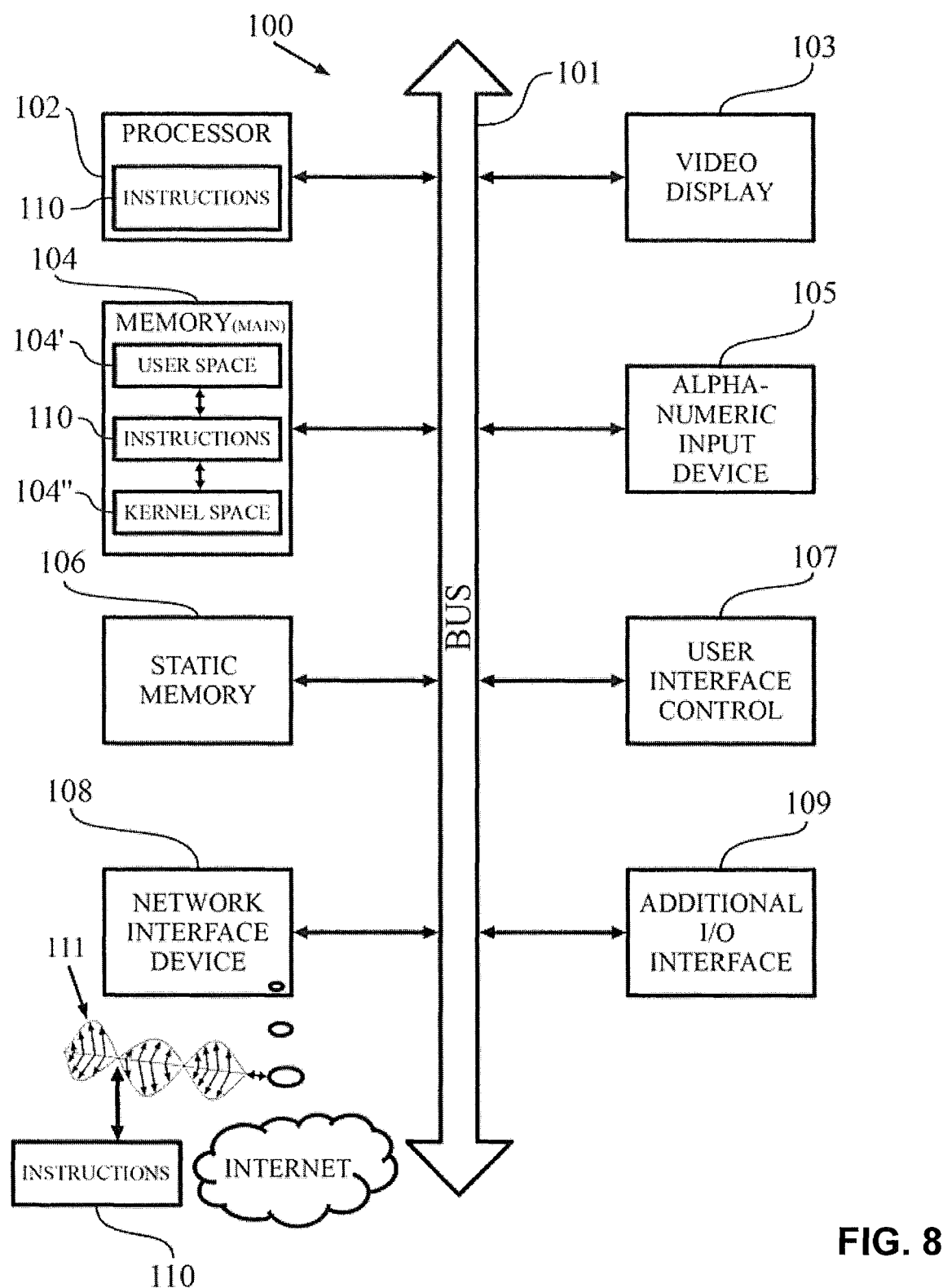
FIG. 8 illustrates an exemplary computer system implementing a re-computation controller arranged to perform the re-computation scheduling as described herein.

Finally, FIG. 8 is a diagrammatic representation of a computer system 100 which provides the functionality of the re-computation controller 2 as shown in FIG. 1, initiating the re-computation of the pre-computed as describe herein. Within the re-computation controller 2 a set of instructions 110, to cause the computer system 100 to perform any of the methods discussed herein, may be executed. The re-computation controller 2 includes a processor 102, a main memory 104 and a network interface device 108. The main memory 104 includes a user space 104', which is associated with user-run applications, and a kernel space 104", which is reserved for operating-system- and hardware-associated applications. The computer system components 102 to 109 are interconnected by a data bus 101. Optionally, it may further include a static memory 106, e.g. non-removable flash and/or solid-state drive and/or a removable Micro or Mini SD card, which permanently stores software enabling the computer system 100 to execute functions of the computer system 100 and an additional I/O interface 109, such as card reader and USB interfaces may be present. A video display 103, a user interface control module 107 and/or an alpha-numeric input device 105. The network interface device 108 connects the data re-computation controller 2 to the computation platform 3 performing the re-computation of the pre-computed search results 6, the Internet and/or any other network. A set of instructions (i.e. software) 110 embodying any one, or all, of the methods described above, resides completely, or at least partially, in or on a machine-readable medium, e.g. the main memory 104 and/or the processor 102. The software 110 may further be transmitted or received as a propagated signal 111 via the Internet through the network interface device 108.

In general, the routines executed to implement the embodiments of the invention, whether implemented as part of an operating system or a specific application, component, pro-gram, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

The invention claimed is:

1. A method for re-computing pre-computed search results performed in a database environment, the database environment comprising:

at least one search platform for maintaining the pre-computed search results, wherein the at least one search platform provides at least two groups of the pre-computed search results to requesting clients at given provision times including a first group of the pre-computed search results at a first provision time and a second group of the pre-computed search results at a second provision time;

a re-computation controller for controlling re-computation of the pre-computed search results on a basis of validity probabilities associated with the pre-computed search results; and a computation platform for re-computing the pre-computed search results; and the method comprising:

determining available computing resources of the computation platform;

scheduling, by the re-computation controller, the re-computation of the first group and the second group of the pre-computed search results by the computation platform based on the available computing resources of the computation platform, wherein the validity probabilities associated with the pre-computed search results of the first group and the second group of the pre-computed search results and the respective provision times are maximized such that a validity probability of the pre-computed search results of the first group is maximized at the first provision time and a validity probability of the pre-computed search results of the second group is maximized at the second provision time;

re-computing, by the computation platform, the pre-computed search results according to the scheduling of the re-computation of the first group and the second group of the pre-computed search results by the re-computation controller; and providing, by the at least one search platform, the first group of the pre-computed search results at the first provision time and the second group of the pre-computed search results at the second provision time to the requesting clients.

2. The method of claim 1, further comprising:
determining, by the re-computation controller, that the computation platform has computing resources that are insufficient to re-compute all pre-computed search results of the first group and the second group of the pre-computed search results until the respective provision times; and
wherein scheduling the re-computation of the first group and the second group of the pre-computed search results comprises:
assigning a first portion of the computing resources of the computation platform available until the first provision time to the first group of the pre-computed search results to conclude re-computation of at least a subset of the first group of the pre-computed search results until the first provision time, and
assigning a second portion of the computing resources of the computation platform available until the second provision time to the second group of the pre-computed search results to conclude re-computation of at least a subset of the second group of the pre-computed search results until the second provision time.

3. The method of claim 1, wherein scheduling the re-computation of the first group and the second group of the pre-computed search results comprises:
determining the first provision time of the first group of the pre-computed search results and determining the second provision time of the second group of the pre-computed search results;
determining computation resources required to re-compute the pre-computed search results of the first group and determining computation resources required to re-compute the pre-computed search results of the second group;
determining the available computation resources of the computation platform during a time period prior to the first provision time and the second provision time; and
in response to determining that the computation resources of the computation platform are insufficient to re-compute all pre-computed search results of the first group and the second group of the pre-computed search results until the respective provision times:
selecting the pre-computed search results of the first group and the second group for re-computation based on validity probabilities of the pre-computed search results of the first group and the second group, and
determining which of the selected pre-computed search results of the first group and the second group are to be re-computed at which re-computation time.

4. The method of claim 3, further comprising:
in response to determining that the computation resources of the computation platform are sufficient to re-compute all pre-computed search results of the first group and the second group of the pre-computed search results until the respective provision times, determining which of the pre-computed search results of the first group and the second group of the pre-computed search results are to be re-computed at which re-computation time.

5. The method of claim 1, wherein scheduling the re-computation of the first group and the second group of the pre-computed search results comprises:
determining a weight $W_{ij}$ for each pre-computed search result $D_i$ of the first group and the second group of the pre-computed search results,
wherein the weight $W_{ij}$ specifies a gain provided by a re-computation of the respective pre-computed search result $D_i$ at a time slot $S_j$ prior to the respective provision time of the first group and the second group of the pre-computed search results.

6. The method of claim 1, wherein the at least one search platform receives requests for the pre-computed search results of the first group of the pre-computed search results and/or the second group of the pre-computed search results at an arbitrary point of time, and scheduling of the re-computation of the first group and the second group of the pre-computed search results is additionally based on an access frequency of the first group and of the second group of the pre-computed search results.

7. The method of claim 1, wherein the respective provision times of the first group of the pre-computed search results and the second group of the pre-computed search results are set by the requesting clients.

8. The method of claim 1, wherein the pre-computed search results of the first group of the pre-computed search results and the second group of the pre-computed search results are retrieved by the requesting clients.

9. A system comprising:
at least one search platform for maintaining pre-computed search results, wherein the at least one search platform maintains the pre-computed search results by providing at least two groups of the pre-computed search results to requesting clients, including a first group of the pre-computed search results at a first provision time and a second group of the pre-computed search results at a second provision time;
a computation platform for re-computing the pre-computed search results;
a re-computation controller for controlling re-computation of the pre-computed search results on a basis of validity probabilities associated with the pre-computed search results by:
determining available computing resources of the computation platform; and
scheduling the re-computation of the first group and the second group of the pre-computed search results by the computation platform based on the available computing resources of the computation platform, wherein the validity probabilities associated with the pre-computed search results of the first group and the second group of the pre-computed search results and the respective provision times are maximized such that a validity probability of the pre-computed search results of the first group is maximized at the first provision time and a validity probability of the pre-computed search results of the second group is maximized at the second provision time;
wherein the pre-computed search results are re-computed by the computation platform according to the scheduling of the re-computation of the first group and the second group of the pre-computed search results by the re-computation controller; and
wherein the first group of the pre-computed search results are provided by the at least one search platform at the first provision time and the second group of the pre-computed search results at the second provision time to the requesting clients.

10. The system of claim 9, wherein the re-computation controller further controls the re-computation of the pre-computed search results by:
   determining that the computation platform has computing resources that are to insufficient re-compute all pre-computed search results of the first group and the second group of the pre-computed search results until the respective provision times; and
   wherein scheduling the re-computation of the first group and the second group of the pre-computed search results comprises:
      assigning a first portion of the computing resources of the computation platform available until the first provision time to the first group of the pre-computed search results to conclude re-computation of at least a subset of the first group of the pre-computed search results until the first provision time, and
      assigning a second portion of the computing resources of the computation platform available until the second provision time to the second group of the pre-computed search results to conclude re-computation of at least a subset of the second group of the pre-computed search results until the second provision time.

11. The system of claim 9, wherein scheduling the re-computation of the first group and the second group of the pre-computed search results comprises:
   determining the first provision time of the first group of the pre-computed search results and determining the second provision time of the second group of the pre-computed search results;
   determining computation resources required to re-compute the pre-computed search results of the first group and determining computation resources required to re-compute the pre-computed search results of the second group;
   determining the available computation resources of the computation platform during a time period prior to the first provision time and the second provision time; and
   in response to determining that the computation resources of the computation platform are insufficient to re-compute all pre-computed search results of the first group and the second group of the pre-computed search results until the respective provision times:
      selecting the pre-computed search results of the first group and the second group for re-computation based on validity probabilities of the pre-computed search results of the first group and the second group, and
      determining which of the selected pre-computed search results of the first group and the second group are to be re-computed at which re-computation time.

12. The system of claim 11, wherein the re-computation controller further controls the re-computation of the pre-computed search results by:
   in response to determining that the computation resources of the computation platform are sufficient to re-compute all pre-computed search results of the first group and the second group of the pre-computed search results until the respective provision times, determining which of the pre-computed search results of the first and the second group of the pre-computed search results are to be re-computed at which re-computation time.

13. The system of claim 9, wherein scheduling the re-computation of the first group and the second group of the pre-computed search results comprises:
   determining a weight $W_{ij}$ for each pre-computed search result $D_i$ of the first group and the second group of the pre-computed search results,
   wherein the weight $W_{ij}$ specifies a gain provided by a re-computation of the respective pre-computed search result $D_i$ at a time slot $S_j$ prior to the respective provision time of the first group and the second group of the pre-computed search results.

14. The system of claim 9, wherein the at least one search platform receives requests for pre-computed search results of the first group of the pre-computed search results and/or the second group of pre-computed search results at an arbitrary point of time, and scheduling of the re-computation of the first group and the second group of the the pre-computed search results is additionally based on an access frequency of the first group and of the second group of the pre-computed search results.

15. The system of claim 9, wherein the respective provision times of the first group of the pre-computed search results and the second group of the pre-computed search results are set by the requesting clients.

16. The system of claim 9, wherein the pre-computed search results of the first group of the pre-computed search results and the second group of the pre-computed search results are retrieved by the requesting clients.

17. A computer program product comprising:
   a non-transitory computer-readable storage medium; and
   instructions stored on the non-transitory computer-readable storage medium that, when executed by a processor, cause the processor to control re-computation of pre-computed search results, by providing a first group of the pre-computed search results at a first provision time and a second group of the pre-computed search results at a second provision time to requesting clients on a basis of validity probabilities being associated with the pre-computed search results by:
      determining available computing resources of a computation platform; and
      scheduling the re-computation of the first group and the second group of the pre-computed search results by the computation platform based on the available computing resources of the computation platform, wherein the validity probabilities associated with the pre-computed search results of the first group and the second group of the pre-computed search results and the respective provision times are maximized such that a validity probability of the pre-computed search results of the first group is maximized at the first provision time and a validity probability of the pre-computed search results of the second group is maximized at the second provision time;
   wherein the pre-computed search results are re-computed by the computation platform according to the scheduling of the re-computation of the first group and the second group of the pre-computed search results by a re-computation controller; and
   wherein the first group of the pre-computed search results are provided by a search platform at the first provision time and the second group of the pre-computed search results at the second provision time to the requesting clients.

18. The computer program product of claim 17, wherein the re-computation controller is further arranged to control the re-computation of the pre-computed search results by the computation platform on the basis of validity probabilities associated with the pre-computed search results by:
  determining that the computation platform has computing resources that are insufficient to re-compute all pre-computed search results of the first and the second group of the pre-computed search results until the respective provision times; and
  wherein scheduling the re-computation of the first group and the second group of the pre-computed search results comprises:
    assigning a first portion of the computing resources of the computation platform available until the first provision time to the first group of the pre-computed search results to conclude re-computation of at least a subset of the first group of the pre-computed search results until the first provision time, and
assigning a second portion of the computing resources of the computation platform available until the second provision time to the second group of pre-computed search results to conclude re-computation of at least a subset of the second group of pre-computed search results until the second provision time.

19. The computer program product of claim 17, wherein scheduling the re-computation of the first group and the second group of the pre-computed search results comprises:
  determining the first provision time of the first group of the pre-computed search results and determining the second provision time of the second group of the pre-computed search results;
  determining computation resources required to re-compute the pre-computed search results of the first group and determining the computation resources required to re-compute the pre-computed search results of the second group;
  determining the available computation resources of the computation platform during a time period prior to the first provision time and the second provision time; and
  in response to determining that the computation resources of the computation platform are insufficient to re-compute all pre-computed search results of the first group and the second group of the pre-computed search results until the respective provision times:
    selecting the pre-computed search results of the first group and the second group for re-computation based on validity probabilities of the pre-computed search results of the first group and the second group, and
determining which of the selected pre-computed search results of the first group and the second group are to be re-computed at which re-computation time.

20. The computer program product of claim 19, wherein the re-computation controller is further arranged to control the re-computation of the pre-computed search results by the computation platform on the basis of validity probabilities associated with the pre-computed search results by:
  in response to determining that the computation resources of the computation platform are sufficient to re-compute all pre-computed search results of the first group and the second group of the pre-computed search results until the respective provision times, determining which of the pre-computed search results of the first group and the second group of the pre-computed search results are to be re-computed at which re-computation time.

\* \* \* \* \*

UNITED STATES PATENT AND TRADEMARK OFFICE
CERTIFICATE OF CORRECTION

PATENT NO. : 11,169,990 B2
APPLICATION NO. : 16/570423
DATED : November 9, 2021
INVENTOR(S) : Cyril Antoine Chambeyron et al.

It is certified that error appears in the above-identified patent and that said Letters Patent is hereby corrected as shown below:

In the Claims

Column 20, Claim 14, Line 15 should read --the second group of the pre-computed search results at an--
Column 21, Claim 18, Line 18 should read --time to the second group of the pre-computed search results to--

Signed and Sealed this
Eleventh Day of January, 2022

Drew Hirshfeld
*Performing the Functions and Duties of the
Under Secretary of Commerce for Intellectual Property and
Director of the United States Patent and Trademark Office*